United States Patent
Ujiie (10) Patent No.: US 11,870,670 B2
(45) Date of Patent: Jan. 9, 2024

(54) INFORMATION PROCESSING DEVICE, INFORMATION PROCESSING SYSTEM, NOTIFICATION METHOD, AND STORAGE MEDIUM

(71) Applicant: OMRON Corporation, Kyoto (JP)

(72) Inventor: Hajime Ujiie, Takatsuki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/605,244

(22) PCT Filed: Mar. 6, 2020

(86) PCT No.: PCT/JP2020/009867
§ 371 (c)(1),
(2) Date: Oct. 21, 2021

(87) PCT Pub. No.: WO2020/235178
PCT Pub. Date: Nov. 26, 2020

(65) Prior Publication Data
US 2022/0217066 A1    Jul. 7, 2022

(30) Foreign Application Priority Data

May 23, 2019  (JP) ................................. 2019-097081

(51) Int. Cl.
*H04L 12/00*    (2006.01)
*H04L 43/0823*    (2022.01)
(Continued)

(52) U.S. Cl.
CPC ...... *H04L 43/0823* (2013.01); *H04L 41/0654* (2013.01); *H04L 41/0686* (2013.01)

(58) Field of Classification Search
CPC .. H04L 43/0823; H04L 41/0686; H04L 69/40
(Continued)

(56) References Cited

U.S. PATENT DOCUMENTS

2009/0097411 A1* 4/2009 Mizushima ............. H04L 43/00
                                                                370/252
2011/0320881 A1    12/2011 Dodson et al.
(Continued)

FOREIGN PATENT DOCUMENTS

CN    102325062    1/2012
CN    104980961    10/2015
(Continued)

OTHER PUBLICATIONS

"Office Action of China Counterpart Application", dated Jul. 5, 2022, with English translation thereof, pp. 1-24.
(Continued)

*Primary Examiner* — Frantz Coby
(74) *Attorney, Agent, or Firm* — JCIPRNET (57) ABSTRACT

An information processing device (20) is provided with: a statistical information acquisition unit (211) which acquires statistical information about communication with another machine connected by a cable; an abnormality determination unit (212) which refers to the statistical information acquired by the statistical information acquisition unit (211) and determines an abnormality in the communication; and an abnormality notification unit (213) which notifies a master device of the determination result, when the determination result from the abnormality determination unit (212) indicates that the communication is abnormal.

16 Claims, 7 Drawing Sheets

(51) Int. Cl.
*H04L 41/0654* (2022.01)
*H04L 41/0686* (2022.01)

(58) Field of Classification Search
USPC .................................................. 709/224–225
See application file for complete search history.

(56) References Cited

U.S. PATENT DOCUMENTS

| | | | |
|---|---|---|---|
| 2015/0117242 | A1 | 4/2015 | Ohkawa et al. |
| 2017/0063662 | A1* | 3/2017 | Yanagihara ......... H04W 40/248 |

FOREIGN PATENT DOCUMENTS

| | | |
|---|---|---|
| CN | 108931948 | 12/2018 |
| CN | 109196430 | 1/2019 |
| JP | 2008181572 | 8/2008 |
| JP | 2015089014 | 5/2015 |
| JP | 2016195329 | 11/2016 |
| JP | 2017517917 | 6/2017 |
| JP | 2018029283 | 2/2018 |
| WO | 2015149444 | 10/2015 |
| WO | WO-2020235178 A1 * 11/2020 .......... G06F 11/0709 |

OTHER PUBLICATIONS

"International Search Report (Form PCT/ISA/210) of PCT/JP2020/009867," dated Jun. 9, 2020, with English translation thereof, pp. 1-4.

"Written Opinion of the International Searching Authority (Form PCT/ISA/237) of PCT/JP2020/009867," dated Jun. 9, 2020, with English translation thereof, pp. 1-6.

Office Action of Japan Counterpart Application, with English translation thereof, dated May 9, 2023, pp. 1-5.

"Search Report of Europe Counterpart Application", dated Jun. 5, 2023, pp. 1-9.

\* cited by examiner

| Date and time | Number of normal frames | Abnormal (Number of link-offs) |
|---|---|---|
| 9:00 AM | 99 | 1 |
| 10:00 AM | 99 | 1 |
| 11:00 AM | 99 | 1 |
| 12:00 AM | 97 | 3 |
| 1:00 PM | 97 | 3 |
| 2:00 PM | 97 | 3 |
| ⋮ | ⋮ | ⋮ |

| Date and time | Number of normal frames (per unit time) | Link-off count | Number of abnormal frames | ... |
|---|---|---|---|---|
| 9:00 AM | 100 | 0 | 0 | ... |
| 10:00 AM | 99 | 1 | 0 | ... |
| 11:00 AM | 94 | 6 | 0 | ... |
| 12:00 AM | 100 | 0 | 0 | ... |
| 1:00 PM | 100 | 0 | 0 | ... |
| 2:00 PM | 100 | 0 | 1 | ... |
| ⋮ | ⋮ | ⋮ | ⋮ | ⋮ |

INFORMATION PROCESSING DEVICE, INFORMATION PROCESSING SYSTEM, NOTIFICATION METHOD, AND STORAGE MEDIUM

CROSS-REFERENCE TO RELATED APPLICATION

This application is a 371 application of the International PCT application serial no. PCT/JP2020/009867, filed on Mar. 6, 2020, which claims the priority benefits of Japan Patent Application No. 2019-097081, filed on May 23, 2019. The entirety of each of the above-mentioned patent applications is hereby incorporated by reference herein and made a part of this specification.

Technical Field

The present invention relates to an information processing device, an information processing system, a notification method, and a storage medium.

Related Art

A network system constituted of a master device and a slave device is used as an industrial network system, and techniques related to the network system are known. Patent literature 1 discloses a method of suppressing a delay in establishing communication processing in a network system including a master device and a slave device. In addition, Patent literature 2 discloses a development support device for a programmable controller (PLC) system that can shorten the time required for investigating the cause of a communication abnormality when the communication abnormality occurs.

CITATION LIST

Patent Literature

Patent literature 1: Japanese Patent Application Laid-Open No. 2016-195329 (published on Nov. 17, 2016)
Patent literature 2: Japanese Patent Application Laid-Open No. 2008-181572 (published on Aug. 7, 2008)

SUMMARY OF INVENTION

Problems to be Solved

In the network system as described above, communication quality may be degraded or communication may be suddenly interrupted due to deterioration of a cable connecting devices, noise caused by an influence of peripheral devices, or the like. In particular, when communication is suddenly interrupted in a field network, it takes a lot of time to identify the cause or restore the network.

In order to address the above problems, a redundancy measure such as duplication of devices by hot standby or making a network topology ring-shaped can be taken, or cables with excellent environmental resistance that can reduce the influence of noise can be used. However, because the above-mentioned measures require significant changes to the system and are technically challenging, it is desirable to monitor the communication quality of the network system periodically without changing the current system or equipment.

On the other hand, when the communication quality of the network system is periodically monitored, for example, there is a problem that it takes time and effort for a user to operate a program in the master device to check for abnormalities.

One aspect of the present invention has been made in consideration of the above problems, and an object of the present invention is to reduce a burden on the user when monitoring the communication quality of a network system.

Means to Solve Problems

The present invention adopts the following configuration to solve the above-mentioned problems.

That is, an information processing device according to one aspect of the present invention includes: a statistical information acquisition unit that acquires statistical information about communication with another machine connected by a cable; an abnormality determination unit that determines an abnormality in the communication with reference to the statistical information acquired by the statistical information acquisition unit; and an abnormality notification unit that notifies a master device of a determination result from the abnormality determination unit, when the determination result indicates that the communication is abnormal.

In addition, the information processing system according to one aspect of the present invention is an information processing system that includes a master device and a slave device connected to the master device by a cable. The slave device includes: a statistical information acquisition unit that acquires statistical information about communication with the master device via a network; an abnormality determination unit that determines an abnormality in the communication with reference to the statistical information acquired by the statistical information acquisition unit; and an abnormality notification unit that notifies the master device of a determination result from the abnormality determination unit, when the determination result indicates that the communication is abnormal.

Besides, a notification method according to one aspect of the present invention is a notification method executed in an information processing device. The notification method includes: a statistical information acquisition step of acquiring statistical information about communication with another machine connected by a cable; an abnormality determination step of determining an abnormality in the communication with reference to the statistical information acquired in the statistical information acquisition step; and an abnormality notification step of notifying a master device of a determination result from the abnormality determination step, when the determination result indicates that the communication is abnormal.

Effects of Invention

According to one aspect of the present invention, the burden on the user for monitoring the communication quality of a network system can be reduced.

DESCRIPTION OF THE EMBODIMENTS

Hereinafter, an embodiment according to one aspect of the present invention (hereinafter, also referred to as "the present embodiment") is described with reference to the drawings.

Embodiment 1

§ 1 Application Example

An information processing device according to the present embodiment is a device that functions as a slave device in a network system that performs, for example, distributed processing or the like, and is, for example, an input/output device, a sensor controller, or the like.

The information processing device acquires statistical information about communication with another machine connected by a cable, and determines a communication abnormality with reference to the statistical information. The information processing device is configured to transmit, when the result of the determination indicates that the communication is abnormal, information indicating the location and type of the abnormality toward a master device side of the network system. Here, the communication abnormality means, for example, a state in which frames cannot be transmitted or received normally or a state in which the transmitted or received frames are defective due to deterioration of the cable connecting the devices or noise caused by the influences of peripheral devices. In addition, the frame is a data format used in data link layer protocol such as EtherCAT or the like.

With the configuration described above, for example, by confirming the information transmitted to the master device when the communication abnormality is detected, the user can take appropriate measures such as changing the cable used for the connection with another machine to a cable having improved environmental performance such as noise resistance or the like. In addition, the burden on the user for monitoring the communication quality of the network system can be reduced.

§ 2 Configuration Example

[Hardware Configuration]
<Information Processing System>

Figure 1:
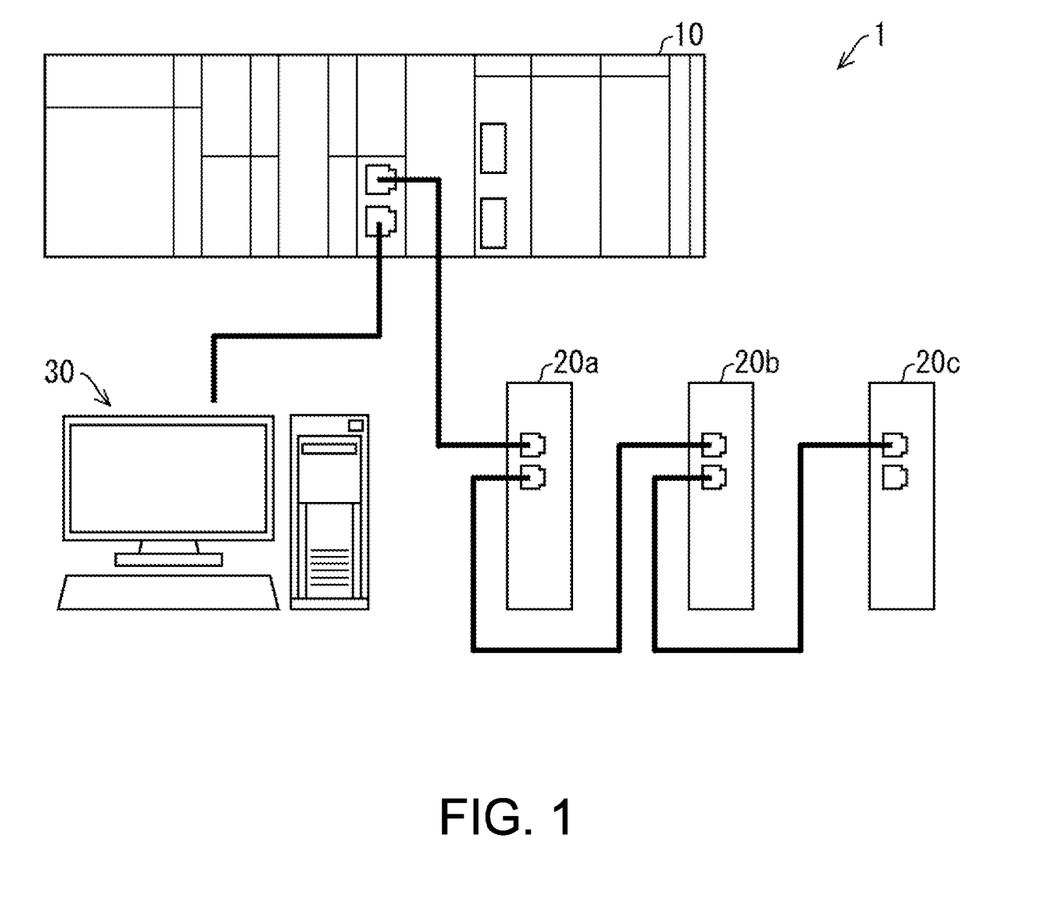
FIG. 1 schematically illustrates an example of an information processing system according to Embodiment 1.

Next, an example of a hardware configuration of the information processing system according to the present embodiment is described with reference to FIGS. 1 and 2. FIG. 1 schematically illustrates an example of a hardware configuration of an information processing system 1 according to the present embodiment. In addition, FIG. 2 is a functional block diagram of the information processing system 1 shown in FIG. 1.

Figure 2:
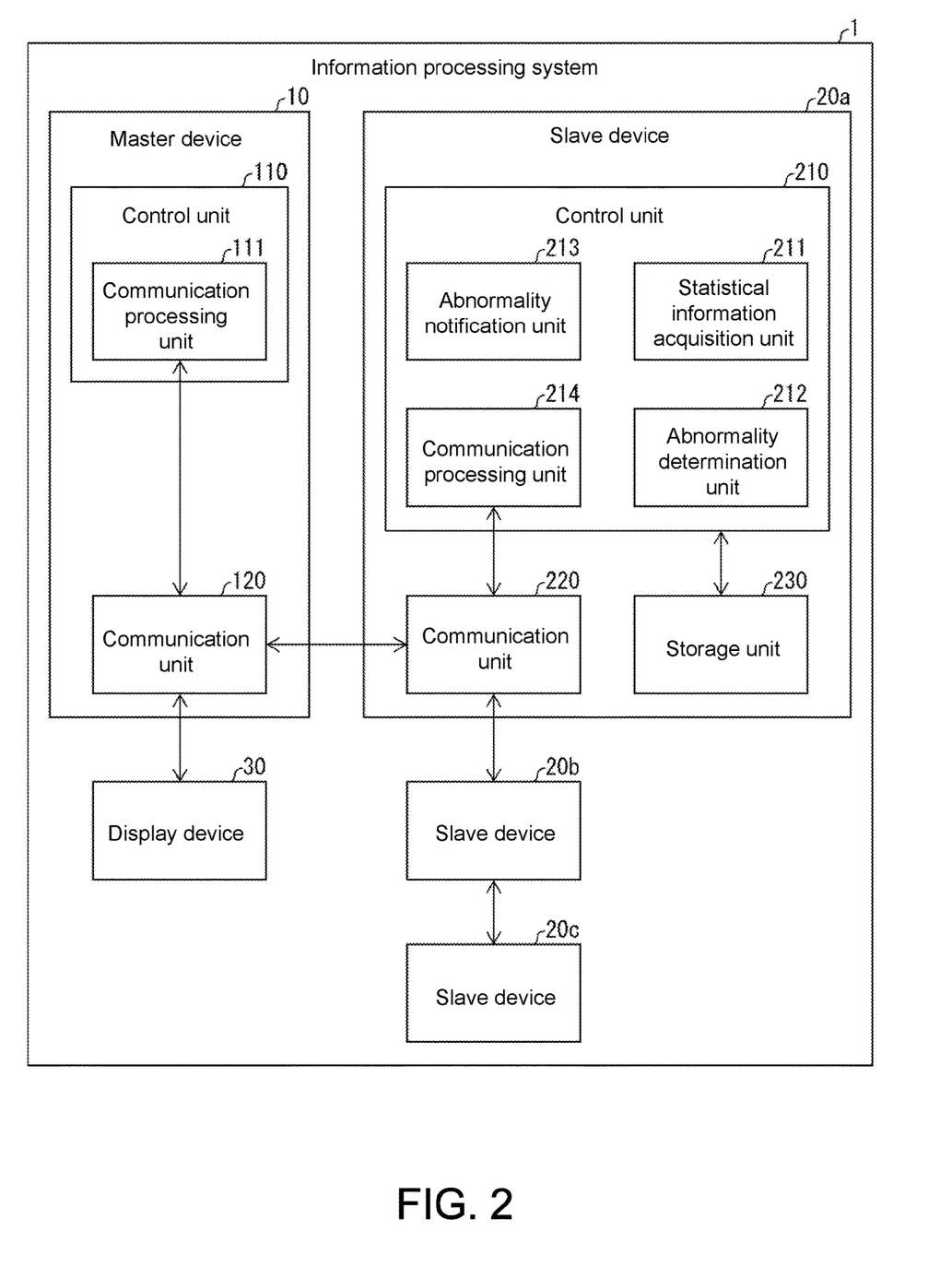
FIG. 2 illustrates an example of a functional block diagram of the information processing system according to Embodiment 1.

As shown in FIGS. 1 and 2, the information processing system 1 according to the present embodiment includes a master device 10, a plurality of slave devices (information processing devices) 20a, 20b, and 20c, and a display device 30. In addition, each device is daisy-chained by cables.

Moreover, in the present specification, a case is described in which the network system constituted by the information processing system 1 is an EtherCAT (registered trademark) standard network system, but the present invention is not limited thereto. The network system may also be, for example, a network system based on standards such as Mechatronic Link (registered trademark), EtherNet/IP, CC-Link (registered trademark), or the like. In addition, the network system constituted by the information processing system 1 may be, for example, a field network system constituted by a group of manufacturing devices in a factory. Additionally, the master device may be, for example, a device such as a programmable logic controller (PLC) or the like. Besides, in the following description, if there is no particular distinction among the slave devices 20a, 20b, and 20c, any one of them may be referred to simply as slave device 20. Moreover, in the information processing system 1 shown in FIGS. 1 and 2, three slave devices 20 are connected to the master device 10, but one or two, or four or more slave devices 20 may also be connected to the master device 10.

The master device 10 includes a control unit 110 and a communication unit 120. The control unit 110 is a control device that controls the entire master device 10 and also functions as a communication control unit 111.

In addition, the control unit 110 includes a central processing unit (CPU), a random access memory (RAM), a read only memory (ROM), and the like, and controls each component according to information processing. Additionally, the same applies to a control unit 210 described later.

The communication control unit 111 performs control relating to the control of communication processing performed by the communication unit 120. The communication unit 120 performs communication processing with the slave device 20, the display device 30, and the like. In addition, the master device 10 may include a memory (storage unit) which is not shown.

The slave device 20 includes the control unit 210, a communication unit 220, and a storage unit 230. The control unit 210 is a control device that controls the entire slave device 20 and also functions as a statistical information acquisition unit 211, an abnormality determination unit 212, an abnormality notification unit 213, and a communication processing unit 214.

The statistical information acquisition unit 211 acquires statistical information about communication with another machine connected by a cable. Here, the statistical information may include information that is referred to as "statistics" in EtherNet. In addition, a detailed example of the statistical information is described later. The abnormality determination unit 212 determines whether or not there is a communication abnormality with reference to the statistical information. When a determination result obtained by the abnormality determination unit 212 indicates that the communication is abnormal, the abnormality notification unit 213 notifies the device on the master device 10 side of the determination result. The communication processing unit 214 performs control relating to the control of communication processing performed by the communication unit 220.

The communication unit 220 performs communication processing with the master device 10 and other slave devices 20. The storage unit 230 is a storage device that stores various information such as statistical information or the like. The display device 30 is a device provided with a display capable of displaying a moving image, or the display itself, such as a personal computer or the like. Moreover, as another aspect, the master device 10 may be configured to include the display device 30, or the display device 30 may be configured to be arranged outside the information processing system 1. In addition, the information processing system 1 shown in FIGS. 1 and 2 has, but is not limited to, a daisy chain type configuration, and may have, for example, a ring topology type configuration.

§ 3 Operation Example 1

[Information Processing System]

Figure 3:
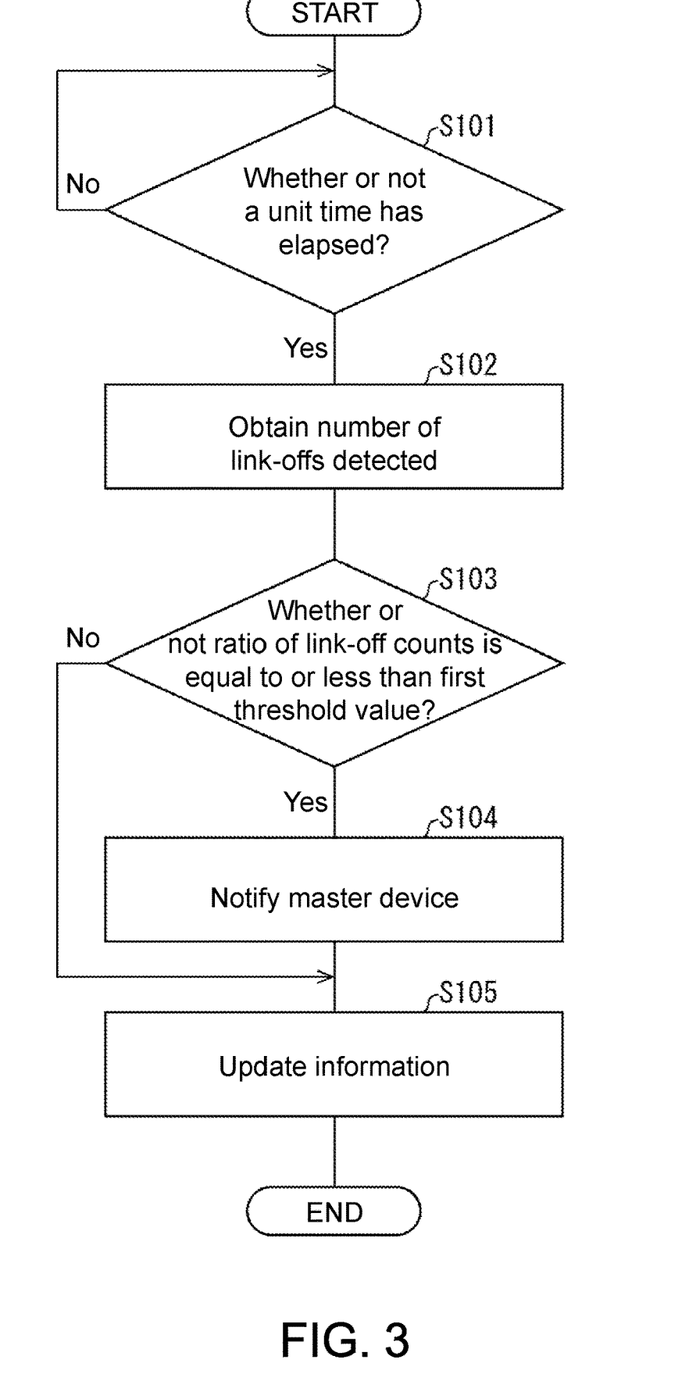
FIG. 3 illustrates an example of processing procedures in the information processing device according to Embodiment 1.

Next, a first operation example of the information processing system 1 is described with reference to FIG. 3. FIG. 3 is a flowchart illustrating an example of processing procedures in the slave device 20. In addition, the slave device 20 repeatedly executes the processing based on the flowchart in FIG. 3 in parallel with normal control operations that should be processed by the slave device 20. Note that, the processing procedure described below is only an example, and each processing may be changed as much as possible. In addition, with respect to the processing procedures described below, steps may be omitted, replaced, and added as appropriate according to the embodiment.

(Step S101)

In step S101, the control unit 210 determines whether or not a predetermined unit time has elapsed since the statistical information acquisition unit 211 acquired previous statistical information. If the control unit 210 determines that the predetermined unit time has elapsed, processing of step S102 is subsequently executed, and if the control unit 210 determines that the predetermined unit time has not elapsed, the determination processing in step S101 is continued. Further, for example, if the statistical information acquisition unit 211 has not yet acquired statistical information since the slave device 20 was started, that is, if the determination processing in step S101 is performed for the first time, the processing of step S102 may be subsequently performed. In addition, the statistical information may be stored in the storage unit 230 at any time after the result of communication is reflected by the control unit 210.

(Step S102)

In the next step S102, the statistical information acquisition unit 211 acquires as statistical information, for example, a total number of link-off counts since the slave device 20 was started. Here, the link-off count means the number of times that the frames meant to be received by the device are not received. In addition, the statistical information acquisition unit 211 calculates the link-off count in the latest unit time by subtracting the total number of link-off counts obtained in the previous time from the total number of link-off counts obtained this time in step S102.

Figure 4:
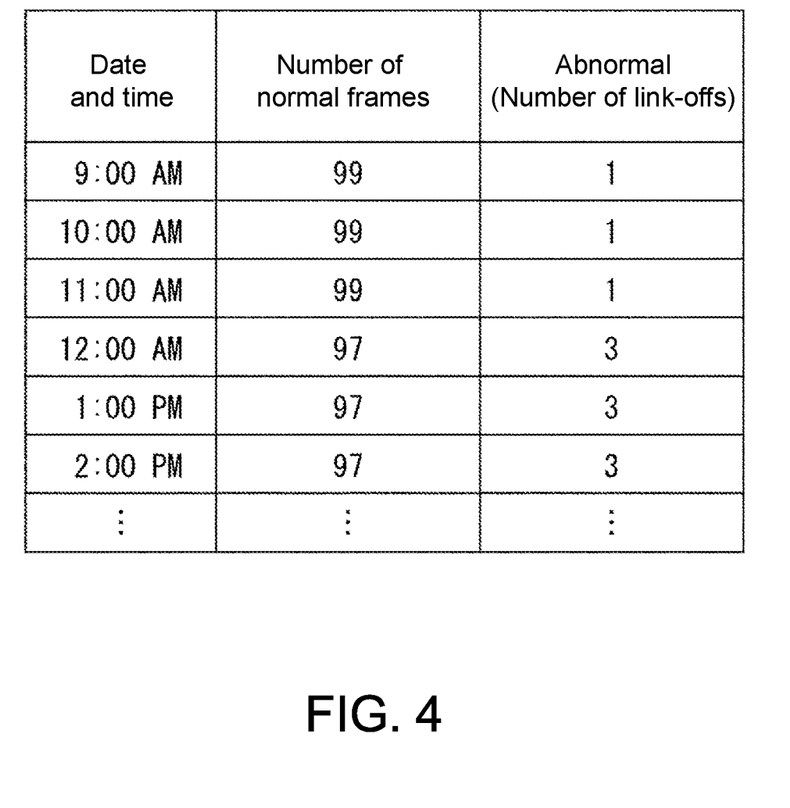
FIG. 4 illustrates an example of a table showing statistical information according to Embodiment 1.

FIG. 4 illustrates an example of a table in which the number of frames received normally and the link-off count are aggregated on an hourly basis. For example, the row with the date and time "10:00 AM" indicates that the slave device 20 normally received 99 frames in one hour from 10:00 AM and one frame could not be received normally.

(Step S103)

In the next step S103, the abnormality determination unit 212 determines whether a ratio of, with respect to the link-off count in a unit time, the link-off count in a unit time immediately before the above unit time is equal to or less than a first threshold value. Assuming that the latest unit time is T and the immediately preceding unit time is T−1, the value of the above ratio is expressed by the following formula.

$$\alpha = \frac{E' : \text{Number of link-offs detected in unit time } T-1}{E : \text{Number of link-offs detected in unit time } T} \quad \text{[Mathematical 1]}$$

In addition, the first threshold value is not limited to a specific value, and may be, for example, 1. If the value of a is equal to or less than the first threshold value, the abnormality determination unit 212 determines that an abnormality has occurred in the cable, and the abnormality notification unit 213 subsequently executes processing of step S104. If the value of a is greater than the first threshold value, the abnormality determination unit 212 determines that no abnormality has occurred in the cable and the control unit 210 subsequently executes processing of step S105.

(Step S104)

In the next step S104, the abnormality notification unit 213 transmits, to the master device 10, information indicating that an abnormality has occurred in the communication due to an abnormality in the cable via another slave device 20 as appropriate. In addition, the master device 10 transmits the received information to the display device 30.

(Step S105)

In the next step S105, the control unit 210 updates the information stored in the storage unit 230, that is, the information indicating the total number of link-off counts and the link-off count in the last unit time. Specifically, the control unit 210 overwrites the total number of link-off counts obtained in the previous time with the total number of link-off counts obtained by the statistical information acquisition unit 211 in the last time. In addition, the control unit 210 overwrites the link-off count in the previous unit time with the link-off count in the last unit time.

[Example of Abnormality Notification]

Figure 5:
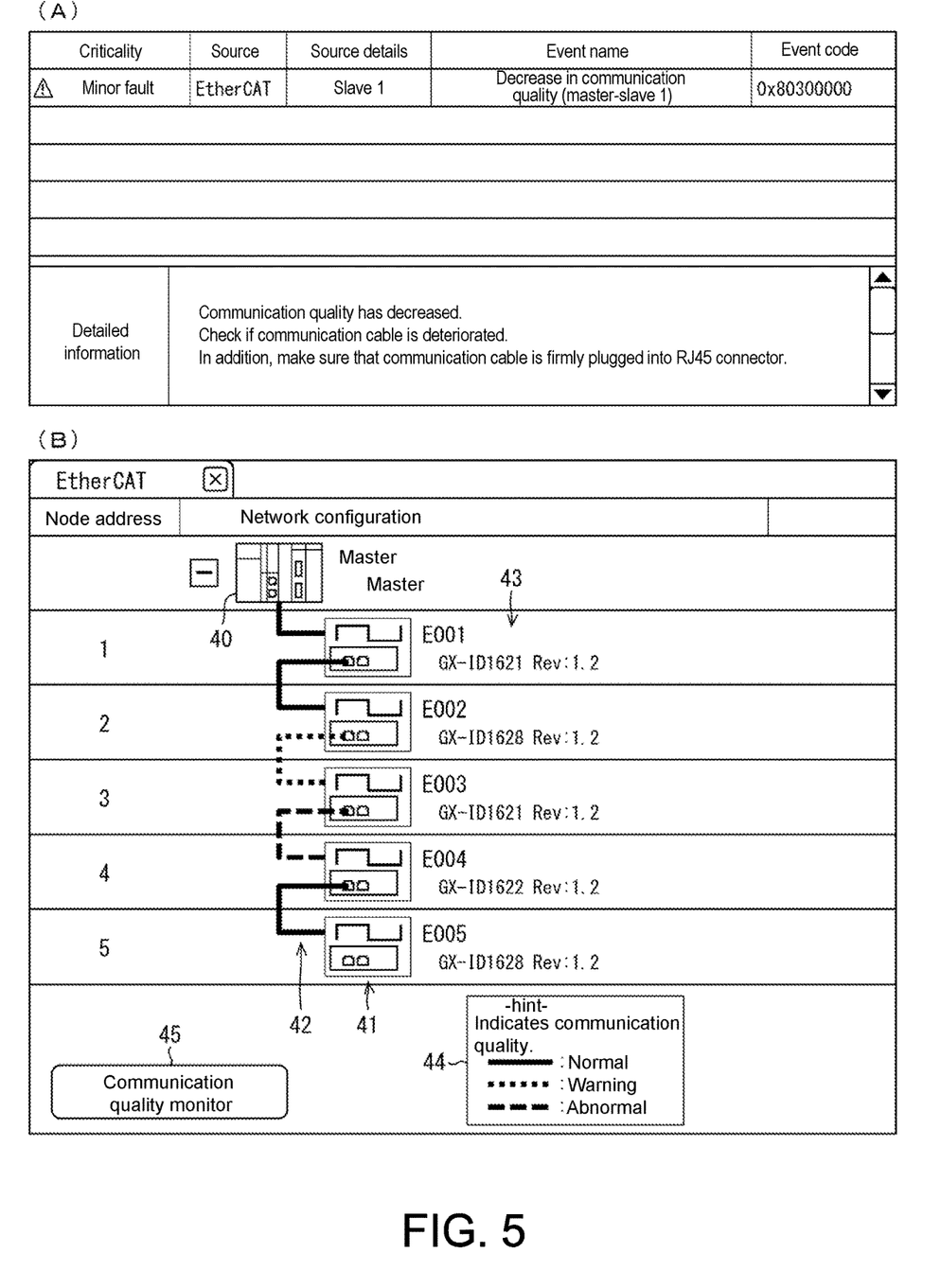
FIG. 5 illustrates an example of a display screen in a display device according to Embodiment 1.

Next, a display example of information indicating a communication abnormality is described with reference to FIG. 5. FIG. 5 illustrates an example of a screen displayed by the display device 30, which displays information about the communication.

In (A) of FIG. 5, the item "Criticality" indicates the amount or urgency of a problem indicated by a target information. The item "Source" is information indicating in which network the communication abnormality occurred. The item "Source details" is information indicating which device the communication abnormality is related to in the network in which the communication abnormality has occurred. The item "Event name" is information indicating the type of the communication abnormality. The item "Event code" is information for uniquely identifying an event about the communication abnormality. In addition, the item "Detailed information" is information corresponding to the currently selected event, and indicates the details of the event, special notes, measures recommended to the user, or the like.

In addition, in (B) of FIG. 5, the master device 10, the slave device 20, and cables connecting each device are illustrated. Specifically, an object 40 indicates the master device 10. An object 41 indicates the slave device 20. An object 42 indicates the cable connecting each device. In addition, a text 43 is information for uniquely identifying the corresponding slave device 20. An object 44 indicates a state of the corresponding cable depending on the difference in the display mode of the object 42 such as the color or the like. As a specific example, the cable connecting the slave device 20 of "E002" and the slave device 20 of "E003" is in a state of "Warning".

In the object 44, "Normal" means that there is no communication abnormality caused by a target cable. "Warning" indicates that the number of times of a communication abnormality detected in the target cable is equal to or less than a predetermined number of times. In addition, the predetermined number of times may be, for example, once or several times. "Abnormal" indicates that the number of times of a communication abnormality detected in the target cable is greater than the predetermined number of times. A button 45 is, for example, a button for displaying a screen shown in (A) of FIG. 5. According to a screen example shown in (B) of FIG. 5, the information indicating in which cable the communication abnormality has occurred is displayed in a visually easy-to-understand manner, so that the user can easily grasp the information.

Operation and Effect

As described above, in the present embodiment, in step S103, the abnormality determination unit 212 determines the communication abnormality with reference to the statistical information about the link-off count, thereby eliminating the need for a user operation on the master device 10 for obtaining the information indicating the presence or absence of the communication abnormality each time. In addition, in step S104, the abnormality notification unit 213 transmits, to the master device 10 side, information indicating that an abnormality has occurred in the communication due to a cable abnormality, thereby enabling centralized management of the information indicating the communication abnormality in the master device 10. Because the location of the communication abnormality caused by the faulty cable is automatically detected and notified, the burden on the user for monitoring the communication quality of the network system can be reduced.

§ 4 Operation Example 2

[Information Processing System]

Figure 6:
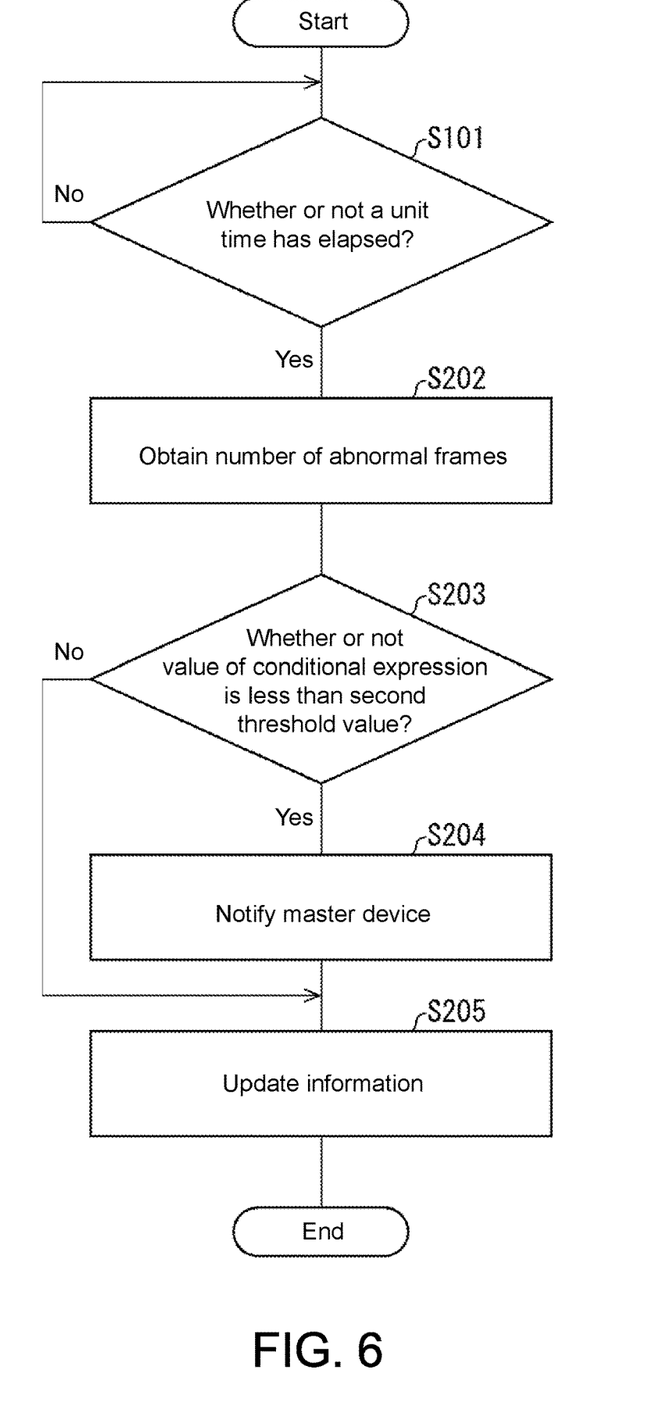
FIG. 6 illustrates an example of processing procedures in the information processing device according to Embodiment 1.

Next, a second operation example of the information processing system 1 is described with reference to FIGS. 6 and 7. FIG. 6 is a flowchart illustrating an example of processing procedures of the slave device 20. In addition, the slave device 20 repeatedly executes the processing based on the flowchart in FIG. 6 in parallel with the normal control operations that should be processed by the slave device 20.

(Step S101)

In step S101, the control unit 210 performs the same processing as in operation example 1. Moreover, if the control unit 210 determines that a predetermined unit time has elapsed since the statistical information acquisition unit 211 acquired the previous statistical information, or if, for example, the determination processing in step S101 is performed for the first time after the slave device 20 is started, the processing of step S202 is subsequently performed.

(Step S202)

In the next step S202, the statistical information acquisition unit 211 acquires as statistical information, for example, the total number of invalid frames since the slave device 20 was started. Here, the invalid frame is, for example, a frame corresponding to any of the following, and a frame having any abnormality.

Abnormality related to data link layer
FCS Check Sum mismatch
Incorrect Start Frame Delimiter
Presence or absence of Preamble
Abnormality related to physical layer
Abnormality in Manchester code
Abnormality in 4B/5B code
Short frame
Frame exceeding maximum length In addition, the statistical information acquisition unit 211 calculates the number of invalid frames in the latest unit time by subtracting the total number of invalid frames obtained in the previous time from the total number of invalid frames obtained this time in step S202. Here, the number of invalid frames in the latest unit time can also be referred to as an increase in the number from the number of invalid frames obtained in the previous time. However, the first invalid frame that occurred in each unit time may not be counted in the increase number as it is considered to be unreliable.

Figure 7:
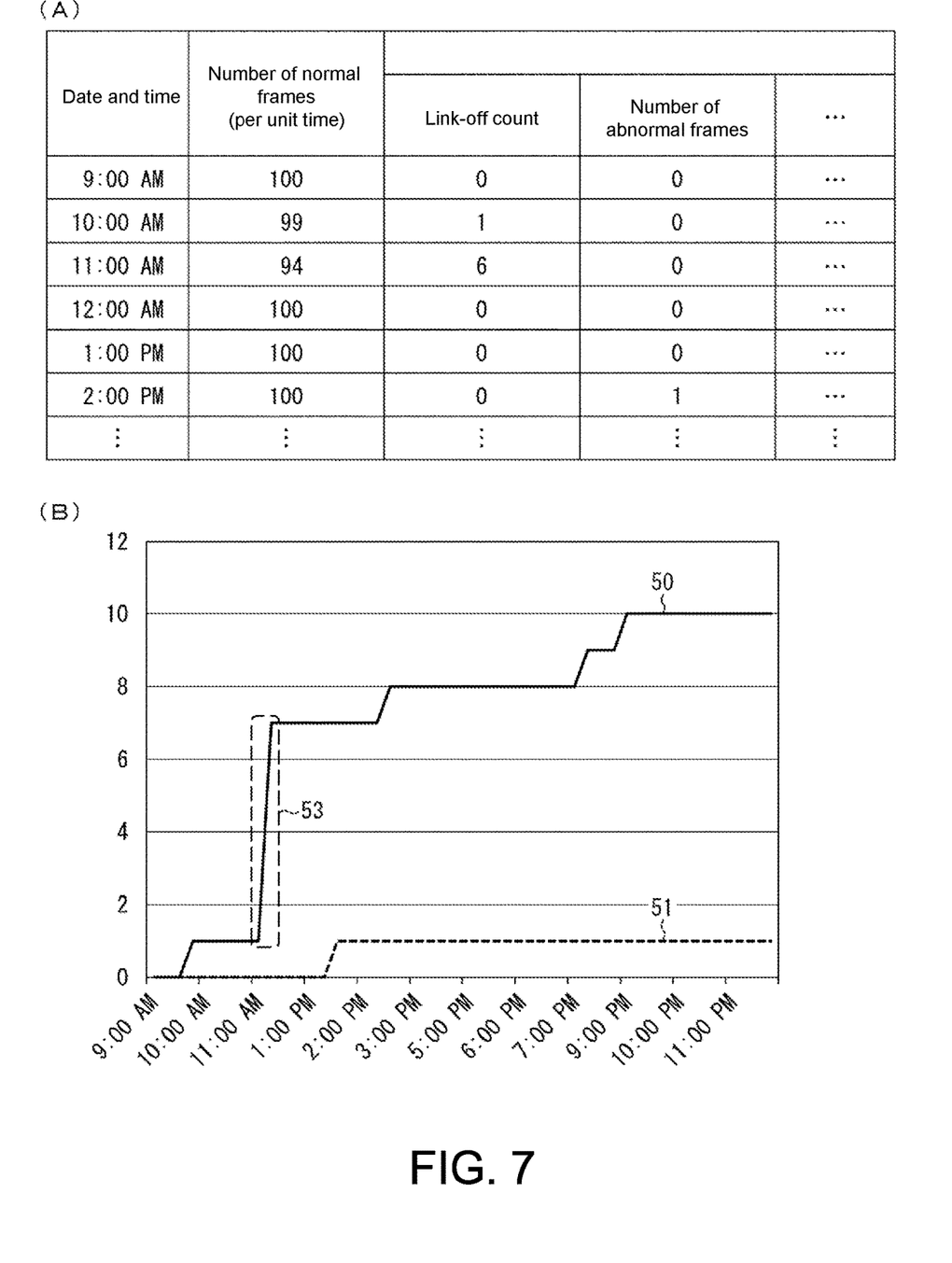
FIG. 7 illustrates an example of a table and a graph showing statistical information according to Embodiment 1.

(A) of FIG. 7 shows an example of a table in which the number of normally received frames, the link-off count, and the number of invalid frames are aggregated on an hourly basis. For example, the row with the date and time "2:00 PM" indicates that the slave device 20 received 100 frames in one hour from 2:00 PM, and one of those frames was an invalid frame. In addition, the link-off and the reception of the invalid frame can be regarded as an abnormal frame reception. In other words, (A) of FIG. 7 shows that the statistical information includes the number of normal frames which is the number of normal frame receptions, and the number of abnormal frames which is the number of abnormal frame receptions.

(Step S203)

In the next step S203, the abnormality determination unit 212 determines whether or not the value of the Poisson distribution formula, which uses an increase in the number of the invalid frames as a random variable value and uses a time average of the total number of the invalid frames as a parameter, is equal to or less than a second threshold value. In addition, the Poisson distribution formula is as follows.

$$\beta(X=k) = \frac{\lambda^k e^{-\lambda}}{k!} \qquad \text{[Mathematical 2]}$$

Here, the parameter 2 is a value calculated by dividing the total number of the invalid frames by a cumulative operating time. That is, 2 is a time average of the total number of the invalid frames. A value k corresponding to a random variable X is an increase in the number of the invalid frames. e is the base of natural logarithms. In addition, the second threshold value is not limited to a specific value, and may be, for example, 0.25. Additionally, the value of the Poisson distribution formula equal to or less than 0.25 means that the probability of occurrence of an event is a low probability, which is equal to or less than 25%.

If the value of 13 of the Poisson distribution formula is equal to or less than the second threshold value, the abnormality determination unit 212 determines that a communication abnormality due to the influence of noise has occurred, and the abnormality notification unit 213 subsequently executes processing of step S204. If the value of 13 is greater than the second threshold value, the abnormality determination unit 212 determines that no communication abnormality due to the influence of noise has occurred, and the control unit 210 subsequently executes processing of step S205.

(Step S204)

In the next step S204, the abnormality notification unit 213 transmits, to the master device 10, information indicating that an abnormality has occurred in the communication due to the influence of noise via another slave device 20 as appropriate. In addition, the master device 10 transmits the received information to the display device 30.

(Step S205)

In the next step S205, the control unit 210 updates the information stored in the storage unit 230, that is, the information indicating the cumulative operating time and the information indicating the total number of the invalid frames. With respect to the latter, specifically, the control unit 210 overwrites the previous total number of the invalid frames with the total number of the invalid frames obtained by the statistical information acquisition unit 211 in the last time.

[Operation and Effect]

As described above, in the present embodiment, in step S203, the abnormality determination unit 212 determines the communication abnormality with reference to the statistical information about the invalid frames, thereby eliminating the need for a user operation on the master device 10 for obtaining the information indicating the presence or absence of the communication abnormality each time. In addition, in step S204, the abnormality notification unit 213 transmits, to the master device 10 side, information indicating that an abnormality has occurred in the communication due to the influence of noise, thereby enabling centralized management of the information indicating the communication abnormality in the master device 10. Because the location of the communication abnormality caused by the influence of noise is automatically detected and notified, the burden on the user for monitoring the communication quality of the network system can be reduced.

In addition, (B) of FIG. 7 is a graph corresponding to the table in (A) of FIG. 7. In the above graph, line 50 corresponds to the total number of link-off counts, and line 51 corresponds to the total number of the invalid frames. (A) of FIG. 7 and a location 53 in (B) of FIG. 7 show that the link-off occurred six times in one hour from 11:00 AM. It is considered that many link-offs occurred temporarily due to an abnormality in the cable or an influence of sudden noise. The steps based on the flowchart in FIG. 6 also contribute to the understanding of the user that the link-offs were caused by the influence of noise.

Variation Example of Embodiment 1

With respect to operation example 2, the statistical information does not need to include the total number of the invalid frames of all the types described in step S202, and may include the total number of the invalid frames of at least one type. For example, the statistical information includes the number of short frames and the number of frames over the maximum length, that is, the number of frames having a length that exceeds the maximum length. The abnormality determination unit 212 may be configured to determine that the communication is abnormal due to noise, when the value of the Poisson distribution formula, which uses an increase in the number of the short frames and the frames over the maximum length as a random variable value and uses a time average of the total number of the short frames and the frames over the maximum length as a parameter, is equal to or less than the second threshold value.

In addition, with respect to the determination processing in step S203, the abnormality determination unit 212 may determine that the communication is abnormal when the number of the abnormal frames in a unit time exceeds a predetermined threshold value. Accordingly, the presence or absence of a communication abnormality can be determined based on the number of the abnormal frames in a unit time.

In addition, in operation example 1 described above, an example has been described in which determination on the abnormality in the cable is made based on the ratio of the number of occurrences of the communication abnormality (the link-off count) in continuous unit times, and in operation example 2, an example has been described in which determination on the influence of noise is made based on the value of the Poisson distribution which uses the increase number of the communication abnormality (the increase number of the invalid frames) as the random variable value. The above description does not mean that the presence or absence of the abnormality in the cable or the like is required to be determined by the number of occurrences of the communication abnormality in a unit time or the ratio thereof. Also, the above description does not mean that the presence or absence of the abnormality due to the influence of noise is required to be determined based on the value of the Poisson distribution.

For example, the presence or absence of an abnormality in the cable or the like may be determined based on the value of the Poisson distribution using the link-off count, or the influence of noise may be determined based on the number of the invalid frames in a unit time or the ratio thereof.

In addition, the present invention is not limited to a configuration in which the statistical information is stored in the slave device 20, and may also adopt a configuration in which the master device 10 acquires and stores the statistical information from the slave device 20. In the latter configuration, the control unit 110 of the master device 10 may include the statistical information acquisition unit 211 and the abnormality determination unit 212 and perform the same processing.

Embodiment 2

A second embodiment of the present invention is described. It should be noted that, for convenience of description, the members having the same functions as the members described in the above embodiment are designated by the same reference signs, and duplicated description of the matters already described is not repeated. In the present embodiment, description is given on a first configuration in which the user sets a desired first threshold value. After that, description is given on a second configuration in which the user sets a desired second threshold value.

A slave device (information processing device) 20 according to the first configuration has a configuration in which the control unit 210 further includes a first user input acquisition unit and a first threshold value setting unit from the configuration shown in FIG. 2. The first user input acquisition unit acquires a user input related to setting of the first threshold value. The first threshold value setting unit sets the first threshold value with reference to the user input acquired by the first user input acquisition unit.

The slave device 20 according to the first configuration sets the first threshold value in the following steps.

(1) The first user input acquisition unit acquires information indicating the first threshold value to be set, which is input by the user. Moreover, the source of the information may be the slave device 20 or the master device 10. In other words, the user may input the information to the target slave device 20 or to the master device 10. In the latter case, the first user input acquisition unit acquires the information via the communication unit 220.

Further, the information input by the user is not limited to an absolute value of the first threshold value, and may also be a coefficient that sets a magnification from the current first threshold value or a magnification from an automatically calculated first threshold value. In the above case, for example, when the input coefficient is less than 1, it becomes difficult to detect a communication abnormality in the slave device 20. In particular, when the coefficient is 0, it is substantially impossible to detect a communication abnormality. In addition, when the input coefficient is greater than 1, the communication abnormality can be easily detected in the slave device 20.

(2) The first threshold value setting unit updates the information stored in the storage unit 230 that indicates the first threshold value with the information obtained by the first user input acquisition unit in (1).

According to the first configuration, the first threshold value can be set to a value desired by the user. Moreover, the first threshold values set in each slave device 20 may be different from each other, and the same applies to the second threshold value.

Next, description is given on the second configuration in which the user sets the desired second threshold value. The control unit 210 of the slave device 20 according to the second configuration further includes a second user input acquisition unit and a second threshold value setting unit from the configuration shown in FIG. 2. The second user input acquisition unit acquires a user input related to setting of the second threshold value. The second threshold value setting unit sets the second threshold value with reference to the user input acquired by the second user input acquisition unit.

In addition, the procedures for setting the second threshold value by the slave device 20 according to the second configuration are the same as the procedures for setting the first threshold value by the slave device 20 according to the first configuration except that the "first threshold value" is replaced with the "second threshold value", the "first user input acquisition unit" is replaced with the "second user input acquisition unit", and the "first threshold value setting unit" is replaced with the "second threshold value setting unit". According to the second configuration, the second threshold value can be set to a value desired by the user.

In addition, the configuration may be such that the user can set the desired first threshold value and the second threshold value at the same time. In this configuration, the control unit 210 further includes the first user input acquisition unit, the first threshold value setting unit, the second user input acquisition unit, and the second threshold value setting unit from the configuration shown in FIG. 2.

SUMMARY

The information processing device 20 (20a, 20b, 20c) according to one aspect of the present invention includes: the statistical information acquisition unit 211 that acquires statistical information about communication with another machine connected by a cable; the abnormality determination unit 212 that determines an abnormality in the communication with reference to the statistical information acquired by the statistical information acquisition unit 211; and the abnormality notification unit 213 that notifies the master device 10 of a determination result from the abnormality determination unit 212, when the determination result indicates that the communication is abnormal. The above configuration does not require a user operation on the master device 10 for obtaining information indicating the presence or absence of a communication abnormality each time. In addition, the master device 10 can centrally manage the information indicating the communication abnormality that has occurred in the network system. Therefore, according to the above configuration, the burden on the user for monitoring the communication quality of the network system can be reduced.

In the information processing device 20 according to the above aspect, the statistical information may include a number of normal frames which is a number of normal frame receptions, and a number of abnormal frames which is a number of abnormal frame receptions. According to this configuration, it is possible to determine the communication abnormality with reference to the number of normal frames and the number of abnormal frames.

In the information processing device 20 according to the above aspect, the abnormality determination unit 212 may determine that the communication is abnormal when the number of abnormal frames within a predetermined unit time exceeds a predetermined threshold value. According to this configuration, the presence or absence of a communication abnormality can be determined based on the number of invalid frames within a predetermined unit time.

In the information processing device 20 according to the above aspect, the statistical information includes the link-off count, and when a ratio of a link-off count in a unit time immediately before one unit time to a link-off count in the one unit time is equal to or less than the first threshold value, the abnormality determination unit 212 determines that the communication is abnormal due to a cable abnormality. According to this configuration, a communication abnormality due to the faulty cable can be detected.

The information processing device 20 according to the above aspect may include a first user input acquisition unit for acquiring a user input related to setting of the first threshold value, and a first threshold value setting unit for setting the first threshold value with reference to the user input acquired by the first user input acquisition unit. According to this configuration, the first threshold value can be set to a value desired by the user.

In the information processing device 20 according to the above aspect, the statistical information includes a number of short frames and a number of frames over a maximum length. The abnormality determination unit 212 may determine that the communication is abnormal due to noise, when a value of a Poisson distribution formula is less than a second threshold value with an increase in the number of short frames and the number of frames over the maximum length being a random variable value, and a time average of a total number of the number of short frames and the number of frames over the maximum length being a parameter. According to this configuration, a communication abnormality due to noise can be detected.

The information processing device 20 according to the above aspect may include a second user input acquisition unit for acquiring a user input related to setting of the second threshold value, and a second threshold value setting unit for setting the second threshold value with reference to the user input acquired by the second user input acquisition unit. According to this configuration, the second threshold value can be set to a value desired by the user.

In addition, the information processing system 1 according to one aspect of the present invention includes the master device 10 and the slave devices 20 (20a, 20b, 20c) connected to the master device 10 by a cable. The slave device 20 includes: the statistical information acquisition unit 211 that acquires statistical information about the communication with the master device 10 via a network; the abnormality determination unit 212 that determines an abnormality in the communication with reference to the statistical information acquired by the statistical information acquisition unit 211; and the abnormality notification unit 213 that notifies the master device 10 of a determination result from the abnormality determination unit 212, when the determination result indicates that the communication is abnormal. The above configuration does not require an operation on the master device 10 for obtaining information indicating the presence or absence of a communication abnormality each time. Therefore, according to the above configuration, the burden on the user for monitoring the communication quality of the network system can be reduced.

In addition, a notification method according to one aspect of the present invention is a notification method executed in the information processing device 20. The notification method includes: a statistical information acquisition step of acquiring statistical information about communication with another machine connected by a cable; an abnormality determination step of determining an abnormality in the communication with reference to the statistical information acquired in the statistical information acquisition step; and an abnormality notification step of notifying the master device 10 of a determination result from the abnormality determination step, when the determination result indicates that the communication is abnormal. According to this configuration, the burden on the user for monitoring the communication quality of the network system can be reduced.

Further, an information processing program according to one aspect of the present invention is an information processing program for causing a computer to function as the information processing device 20 described in any one of the above. The information processing program causes the computer to function as the statistical information acquisition unit 211, the abnormality determination unit 212, and the abnormality notification unit 213. According to this configuration, the same effect as that of the information processing device 20 according to one aspect of the present invention can be obtained.

Example of Implementation by Software

The control blocks of the slave device 20 (in particular, the statistical information acquisition unit 211, the abnormality determination unit 212, the abnormality notification unit 213, and the communication processing unit 214) and the control blocks of the master device 10 (in particular, the communication control unit 111) may be implemented by a logic circuit (hardware) formed in an integrated circuit (an IC chip) or the like, or may be implemented by software.

In the latter case, the slave device 20 or the master device 10 includes a computer that executes instructions of a program being software that implements each function. This computer includes, for example, one or more processors and a computer-readable recording medium that stores the program. Besides, in the computer, the processor reads the program from the recording medium and executes the program, and thereby the object of the present invention is achieved. The processor may be, for example, a central processing unit (CPU). The recording medium may be a "non-temporary tangible medium", such as a read only memory (ROM), as well as a tape, a disk, a card, a semiconductor memory, a programmable logic circuit, or the like. In addition, the recording medium may further include a random access memory (RAM) or the like that deploys the above program. Additionally, the above program may be supplied to the computer via any transmission medium capable of transmitting the program (communication network, broadcast wave, or the like). Further, one aspect of the present invention may also be implemented in a form of a data signal embedded in a carrier wave, in which the above program is embodied by electronic transmission.

The present invention is not limited to the above-described embodiments, various modifications can be made within the scope of the claims, and embodiments obtained by appropriately combining the technical means respectively disclosed in different embodiments are also included in the technical scope of the present invention.

What is claimed is:

1. An information processing device comprising:
a processor, configured to:
acquire statistical information about communication with another machine connected by a cable;
determine an abnormality in the communication with reference to the statistical information; and
notify a master device of a determination result of the abnormality when the determination result indicates that the communication is abnormal,
wherein the statistical information comprises a number of short frames and a number of frames over a maximum length, and
wherein the processor determines that the communication is abnormal due to noise according to the number of short frames, the number of frames over the maximum length, and a time average of a total number of the number of short frames and the number of frames over the maximum length.

2. The information processing device according to claim 1, wherein the statistical information further comprises:
a number of normal frames which is a number of normal frame receptions; and
a number of abnormal frames which is a number of abnormal frame receptions.

3. The information processing device according to claim 2, wherein the processor determines that the communication is abnormal when the number of abnormal frames within a predetermined unit time exceeds a predetermined threshold value.

4. The information processing device according to claim 1, wherein the statistical information further comprises a link-off count, and
the processor determines that the communication is abnormal due to a cable abnormality when a ratio of a link-off count in a unit time immediately before one unit time to a link-off count in the one unit time is equal to or less than a first threshold value.

5. The infoiiiiation processing device according to claim 4, wherein the processor is further configured to:
acquire a user input related to setting of the first threshold value; and
set the first threshold value with reference to the user input.

6. The information processing device according to claim 1,
wherein the processor determines that the communication is abnormal due to noise, when a value of a Poisson distribution formula is equal to or less than a second threshold value with an increase in the number of short frames and the number of frames over the maximum length being a random variable value, and the time average of the total number of the number of short frames and the number of frames over the maximum length being a parameter.

7. The information processing device according to claim 6, wherein the processor is further configured to:
acquire a user input related to setting of the second threshold value; and
set the second threshold value with reference to the user input.

8. An information processing system comprising a master device and a slave device connected to the master device by a cable,
wherein the slave device comprises a processor configured to:
acquire statistical information about communication with the master device via a network;
determine an abnoii iality in the communication with reference to the statistical information; and
notify the master device of a determination result of the abnormality, when the determination result indicates that the communication is abnormal,
wherein the statistical information comprises a number of short frames and a number of frames over a maximum length, and
wherein the processor determines that the communication is abnormal due to noise according to the number of short frames, the number of frames over the maximum length, and a time average of a total number of the number of short frames and the number of frames over the maximum length.

9. A notification method executed in an information processing device, comprising:
acquiring statistical information about communication with another machine connected by a cable;
determining an abnormality in the communication with reference to the statistical information; and
notifying a master device of a determination result of the abnormality, when the determination result indicates that the communication is abnormal,
wherein the statistical information comprises a number of short frames and a number of frames over a maximum length, and
wherein the communication is deteiixiined to be abnormal due to noise according to the number of short frames, the number of frames over the maximum length, and a time average of a total number of the number of short frames and the number of frames over the maximum length.

10. A non-transitory computer readable storage medium, storing an information processing program for causing a computer to:
acquire statistical information about communication with another machine connected by a cable;
determine an abnormality in the communication with reference to the statistical information; and
notify a master device of a determination result of the abnormality, when the determination result indicates that the communication is abnormal,
wherein the statistical information comprises a number of short frames and a number of frames over a maximum length, and
wherein the communication is determined to be abnormal due to noise according to the number of short frames, the number of frames over the maximum length, and a time average of a total number of the number of short frames and the number of frames over the maximum length.

11. The information processing device according to claim 2, wherein the statistical information further comprises a link-off count, and
the processor determines that the communication is abnormal due to a cable abnormality when a ratio of a link-off count in a unit time immediately before one unit time to a link-off count in the one unit time is equal to or less than a first threshold value.

12. The information processing device according to claim 3, wherein the statistical infon iation further comprises a link-off count, and
the processor determines that the communication is abnormal due to a cable abnoiniality when a ratio of a link-off count in a unit time immediately before one unit time to a link-off count in the one unit time is equal to or less than a first threshold value.

13. The information processing device according to claim 2,
wherein the processor determines that the communication is abnormal due to noise, when a value of a Poisson distribution formula is equal to or less than a second threshold value with an increase in the number of short frames and the number of frames over the maximum length being a random variable value, and the time average of the total number of the number of short frames and the number of frames over the maximum length being a parameter.

14. The information processing device according to claim 3,
wherein the processor determines that the communication is abnormal due to noise, when a value of a Poisson distribution formula is equal to or less than a second threshold value with an increase in the number of short frames and the number of frames over the maximum length being a random variable value, and the time average of the total number of the number of short frames and the number of frames over the maximum length being a parameter.

15. The information processing device according to claim 4,
wherein the processor determines that the communication is abnoiinal due to noise, when a value of a Poisson distribution formula is equal to or less than a second threshold value with an increase in the number of short frames and the number of frames over the maximum length being a random variable value, and the time average of the total number of the number of short frames and the number of frames over the maximum length being a parameter.

16. The information processing device according to claim 5,
the processor deteiiiiines that the communication is abnormal due to noise, when a value of a Poisson distribution formula is equal to or less than a second threshold value with an increase in the number of short frames and the number of frames over the maximum length being a random variable value, and the time average of the total number of the number of short frames and the number of frames over the maximum length being a parameter.

* * * * *